United States Patent Office 3,194,629
Patented July 13, 1965

3,194,629
METHOD OF REMOVING MERCURY VAPOR FROM GASES
John A. Dreibelbis and Ronald S. Joyce, Pittsburgh, Pa., assignors to Pittsburgh Activated Carbon Company, a corporation of Pennsylvania
No Drawing. Filed Feb. 23, 1962, Ser. No. 175,347
2 Claims. (Cl. 23—2)

This invention relates to the removal of mercury vapor from gases.

Mercury vapor is introduced into various gases such as air, hydrogen and carbon dioxide in various ways. A common source of mercury vapor is the mercury electrolytic cell used in electrolysis reactions, e.g. in the formation of hydrogen gas. The hydrogen gas formed is frequently used in the hydrogenation of fats and oils in the production of foodstuffs. Since even small amounts of mercury are poisonous it is important to remove the mercury from the hydrogen gas.

It is an object of the present invention to remove mercury vapor from gases.

Another object is the purification of hydrogen, air and carbon dioxide.

A further object is to clean mercury vapor out of food grade hydrogen.

Yet another object is to recover the mercury removed from the gas.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Activated carbon by itself has been found to be unsatisfactory for removing mercury vapor from gases such as hydrogen, air, carbon dioxide, oxygen and nitrogen since it has a low attraction for mercury and is a poor adsorbent at atmospheric and other relatively low temperatures in spite of its high surface area.

Many materials have been proposed in the past for removal of mercury vapor from gases. One of the best is sulfur. However, when sulfur is employed by itself, large amounts are required to obtain significant removal of the mercury.

It has now been found that the objects of the present invention can be attained by impregnating materials which react with mercury on activated carbon. It has been found that these products will rapidly and in many cases quantitatively remove mercury vapor from gases including hydrogen, air, carbon dioxide, nitrogen and oxygen. The high surface area of the activated carbon which is impregnated with the mercury reactant appears to be in part responsible for the greatly improved adsorption of the mercury vapor and the carbon appears to activate the material which reacts with the mercury.

The action of activated carbon appears to be specific. Thus when silica gel is employed in place of activated carbon as the support for the mercury reactant it is not possible to get a satisfactory coating. Additionally the silica gel readily picks up water vapor which is undesirable. Similarly sulfur on alumina was a much poorer adsorbent for mercury vapor than sulfur on activated carbon.

As the material employed to impregnate the activated carbon there can be used sulfur.

Another preferred form of the invention is to utilize an iodine-potassium iodide mixture ($KI_3$) to impregnate the activated carbon.

The mercury reactant impregnated activated carbon can pick mercury from contaminated air in an amount of over 3% by weight of the reactant. This is 100 times as much mercury as was picked up by the unimpregnated activated carbon. Usually 5–50% of the impregnant is used with the activated carbon.

The granular activated carbon employed generally has a particle size between 4 and 60 mesh although this can be varied. In the specific examples there was employed Pittsburgh type carbon BPL which can be made as described in Zabor Patent No. 2,763,580. There can also be used other activated carbons such as Pittsburgh type CAL, Columbia activated carbon Grade SXAC, Darco activated carbon, etc.

Unless otherwise indicated all parts and percentages are by weight.

*Example 1*

10 grams of activated carbon were impregnated with 3 grams of sulfur dissolved in 20 cc. of carbon disulfide and the mixture evaporated to dryness. The sulfur treated activated carbon thus obtained was placed in a U tube and mercury vapor saturated air was passed through the sample at a rate of 100 cc./min.

There was no mercury breakthrough after over 400 hours when the effluent air was checked for mercury vapor with a modified mercury vapor meter used in safety testing. The mercury was thus rapidly and quantitatively adsorbed.

*Example 2*

10 grams of activated carbon were impregnated with an aqueous solution containing 200 grams/liter of potassium triiodide. The activated carbon was removed by filtration and air dried for 1 hour. There was a 40% pickup of the potassium triiodide.

The potassium triiodide treated activated carbon thus obtained was treated with mercury vapor saturated air in the manner described in Example 1. There was no mercury breakthrough after over 400 hours.

In place of air hydrogen containing mercury can be used in Example 1 or 2.

The preferred materials according to the invention can be used in an amount of 1 ounce to 1000 cu. ft. of gas saturated with mercury vapor. The adsorbent can be used until it is loaded with mercury. This usually occurs at about 3% of mercury. Of course the adsorbent can be regenerated after it has picked up lower amounts of mercury, e.g. 2%.

The purification agent can be used on a one shot or throw away basis.

The mercury preferably is removed from the gas at atmospheric temperature although higher and lower temperatures can be employed. Of course the temperature should not be so high that the mercury will be released from the impregnated activated carbon.

What is claimed is:
1. A process of removing mercury from a gas contaminated with the same comprising passing the gas over activated carbon impregnated with sulfur.
2. A process according to claim 1 wherein the gas is selected from the group consisting of air, hydrogen, carbon dioxide, nitrogen and oxygen.

References Cited by the Examiner

UNITED STATES PATENTS 1,984,164   12/34   Stock _____ 23—4

OTHER REFERENCES

Jacobson: "Encyclopedia of Chemical Reactions," Reinhold Publishing Co., New York, 1951, volume 4, page 548.

MAURICE A. BRINDISI, *Primary Examiner.*